United States Patent
Bensaid et al.

(10) Patent No.: US 12,059,956 B2
(45) Date of Patent: Aug. 13, 2024

(54) SYSTEMS AND METHODS FOR PROVIDING TRANSIENT VEHICLE FEATURES

(71) Applicant: Rivian IP Holdings, LLC, Plymouth, MI (US)

(72) Inventors: Wassym Bensaid, Cupertino, CA (US); Benjamin Noah Drobiz, San Jose, CA (US); Adam Jarrett Smith, Irvine, CA (US); Erik Robert Glaser, San Mateo, CA (US); Gyeong Sik Choi, Mountain View, CA (US); Emily Joan Wilson, Victoria (CA); David McKerron Anderson, San Jose, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 18/091,565

(22) Filed: Dec. 30, 2022

(65) Prior Publication Data
US 2024/0140199 A1  May 2, 2024

Related U.S. Application Data

(60) Provisional application No. 63/420,506, filed on Oct. 28, 2022.

(51) Int. Cl.
*B60K 35/00* (2024.01)
*B60K 35/22* (2024.01)
(Continued)

(52) U.S. Cl.
CPC .............. *B60K 35/00* (2013.01); *B60K 35/22* (2024.01); *B60K 35/26* (2024.01); *B60K 35/28* (2024.01);
(Continued)

(58) Field of Classification Search
None
See application file for complete search history.

(56) References Cited

U.S. PATENT DOCUMENTS 6,536,928 B1 * 3/2003 Hein .................. B60Q 3/85
362/491
9,536,325 B2 * 1/2017 Bray .................. G06F 3/0482
(Continued)

FOREIGN PATENT DOCUMENTS

CN 111190683 A * 5/2020
CN 113183872 A * 7/2021
(Continued)

OTHER PUBLICATIONS

Espacenet English Translation of Description of CN-114974167-A (Year: 2022).*
(Continued)

*Primary Examiner* — James J Lee
*Assistant Examiner* — Andrew Sang Kim
(74) *Attorney, Agent, or Firm* — Haley Guiliano LLP

(57) ABSTRACT

Systems and methods are provided to perform a vehicle function. A vehicle function command is detected and it is determined if an event moved is active. In response to a determination that the event mode is active, an event mode parameter is retrieved. Otherwise, in response to a determination that the event mode is not active, a normal mode (Continued)

parameter is retrieved. The vehicle function is performed based on the retrieved event mode parameter or normal mode parameter.

18 Claims, 11 Drawing Sheets

(51) Int. Cl.
  *B60K 35/26* (2024.01)
  *B60K 35/28* (2024.01)
  *B60K 35/29* (2024.01)
(52) U.S. Cl.
  CPC .......... *B60K 35/29* (2024.01); *B60K 2360/16* (2024.01); *B60K 2360/188* (2024.01); *B60K 2360/33* (2024.01)

(56) References Cited

U.S. PATENT DOCUMENTS

| | | | | |
|---|---|---|---|---|
| 10,589,679 | B1* | 3/2020 | Askeland | B60R 1/00 |
| 2007/0255464 | A1* | 11/2007 | Singh | B60R 25/252 |
| | | | | 701/36 |
| 2020/0047668 | A1* | 2/2020 | Ueno | G08G 1/166 |
| 2020/0086829 | A1* | 3/2020 | Wall | B60R 25/24 |

FOREIGN PATENT DOCUMENTS

| | | | |
|---|---|---|---|
| CN | 114090167 A | * | 2/2022 |
| CN | 114974167 A | * | 8/2022 |

OTHER PUBLICATIONS

Espacenet English Translation of Description of CN-111190683-A (Year: 2020).*
Espacenet English Translation of Description of CN-113183872-A (Year: 2021).*
Espacenet English translation of the description of CN114090167A (Year: 2022).*
Waze, Drive with Zombies (or run from them) this spooky season, Oct. 12, 2022 (Year: 2022).*
Into The Parkerverse, How to Get Custom UNLOCK & LOCK Sounds on ANY Android—Change Sleep Wake Sound Tutorial—2022 Guide, Mar. 30, 2022, Youtube, https://www.youtube.com/watch?v=tFJesoRhFNo (Year: 2022).*
Thic Whips, Bimmercode: Acoustical Lock/Unlock Confirmation (Beeping), Feb. 6, 2019, Youtube, https://www.youtube.com/watch?v=jh7FeX23SPY (Year: 2019).*
Mercedes-Benz of Scottsdale, How to change the ambient lighting in Mercedes-Benz GLE, Jun. 17, 2019, https://www.mbscottsdale.com/blog/how-to-change-the-ambient-lighting-in-mercedes-benz-gle/ (Year: 2019).*
The Megawatts, Tesla Model 3 Lock Confirmation ALL Scenarios Firmware 2018.26.3, Aug. 8, 2018, Youtube, https://www.youtube.com/watch?v=aoqS_fANEs4, (Year: 2018).*

* cited by examiner

FIG. 5

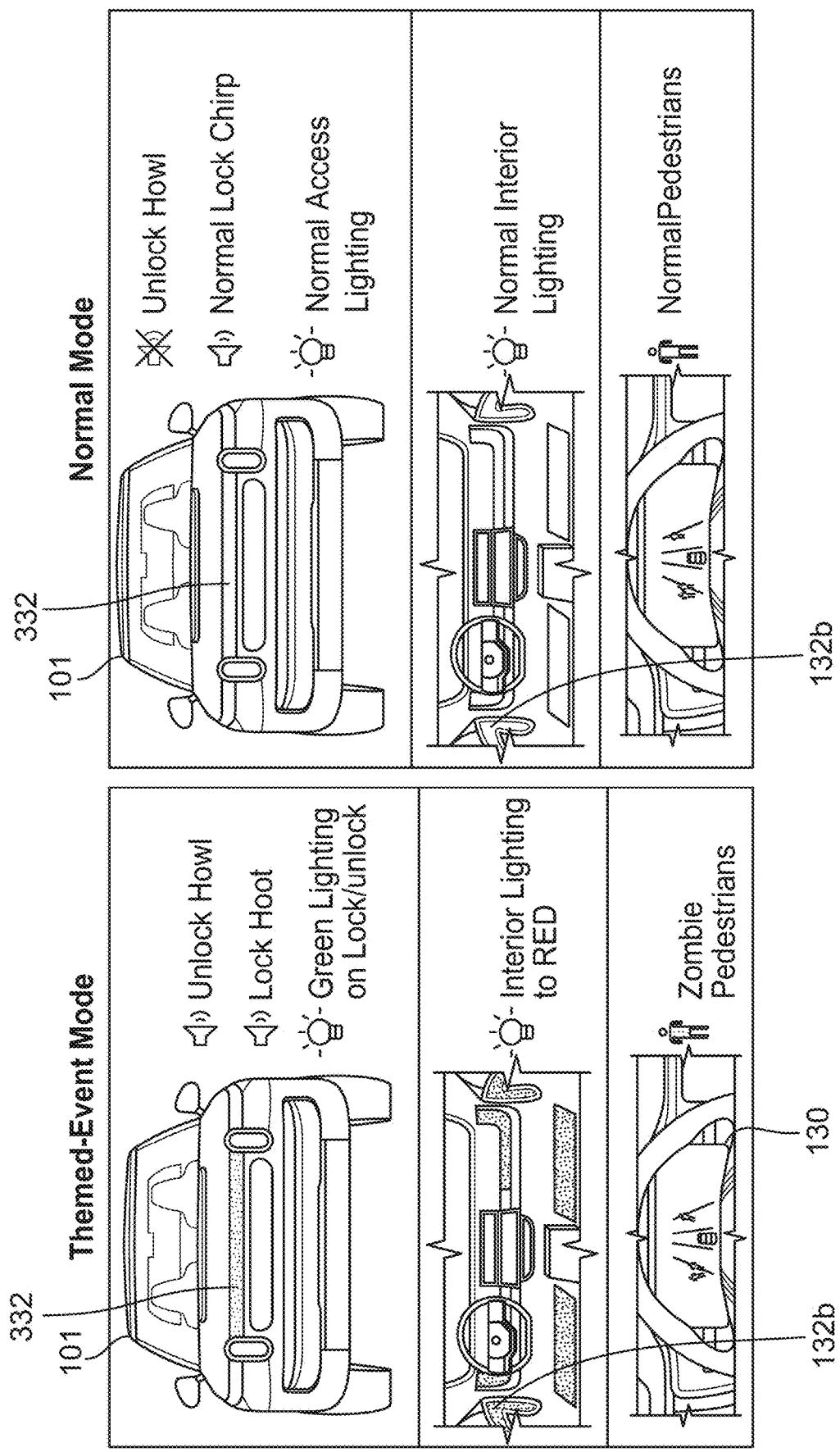

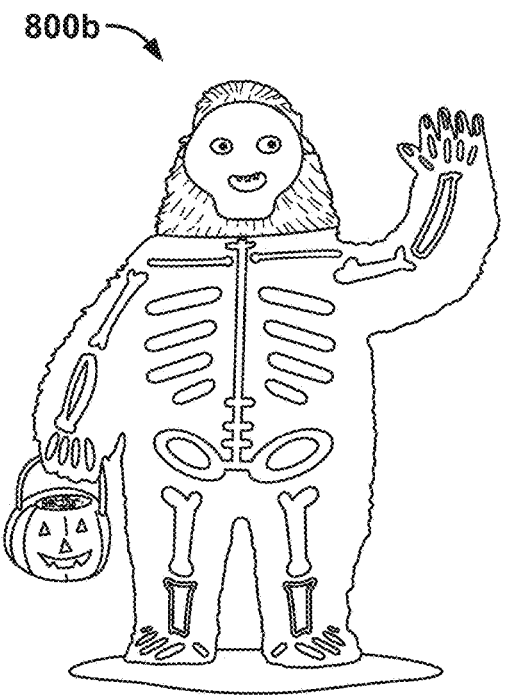
FIG. 8A  FIG. 8B
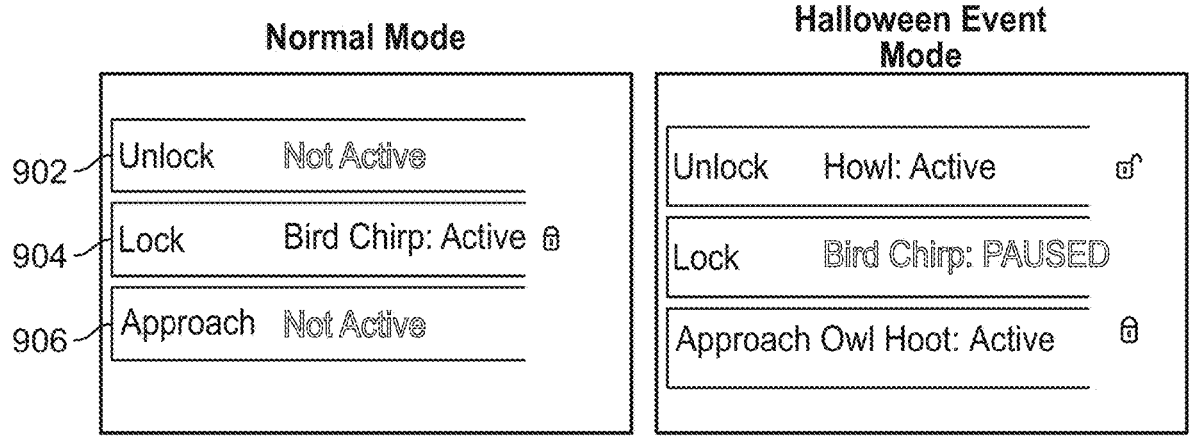
FIG. 9A  FIG. 9B

SYSTEMS AND METHODS FOR PROVIDING TRANSIENT VEHICLE FEATURES

CROSS-REFERENCE TO RELATED APPLICATIONS

This application claims priority to U.S. Provisional Patent Application No. 63/420,506, filed on Oct. 28, 2022, the entire contents of which are hereby expressly incorporated by reference in their entirety.

INTRODUCTION

The present disclosure is directed to providing transient vehicle features, and, more particularly, to providing transient vehicle features of vehicle functions to enhance user experience.

SUMMARY

As vehicles have become increasingly digitized, the number of options provided to a user to customize settings of different vehicle features and systems has also increased. For example, in one approach, a user may customize the display mode of a display provided in a vehicle by selecting the display mode from a menu (e.g., light mode or dark mode). However, depending on the number of customizations that are available, it may be burdensome for the user to find desired customizations. In another approach, certain vehicle features may be automatically changed based on detected environmental conditions. For example, the display may operate in a day mode or a night mode based on the detected ambient light. However, the variability of other features that are not dependent on detected environmental conditions may be limited. In accordance with the present disclosure, event mode time periods (e.g., themed-event periods) are used to provide transient vehicle features of vehicle functions to enhance user experience.

In accordance with the present disclosure, a method of performing a vehicle function is provided. The method includes detecting a vehicle function command, determining if an event mode is active, the event mode including one or more modifications to the vehicle function compared with a normal mode, in response to determining that the event mode is active, retrieving an event mode parameter, and in response to determining that the event mode is not active (e.g., the normal mode is active), retrieving a normal mode parameter. The method further includes performing the vehicle function based on the retrieved event mode parameter or normal mode parameter.

In some embodiments, determining if the event mode is active may include determining if a current time is within a predetermined time period associated with the event mode, and in response to determining that the current time is within the predetermined time period, activating the event mode.

In some embodiments, the method may further include determining, after activating the event mode, if the current time is still within the predetermined time period, and in response to determining that the current time is no longer within the predetermined time period, deactivating the event mode.

In some embodiments, determining if the event mode is active may include determining if a current time is within a predetermined time period associated with the event mode, in response to determining that the current time is within the predetermined time period, displaying a prompt to activate the event mode, and in response to receiving instructions responding to the prompt to activate the event mode, activating the event mode.

In some embodiments, the vehicle function may include displaying a representation of a pedestrian captured by a vehicle sensor, the event mode parameter may be a representation of a zombie, and the normal mode parameter may be a representation of a person. In some embodiments, displaying the representation of the pedestrian may include displaying the retrieved one of the representation of the zombie or the representation of the person.

In some embodiments, the vehicle function may include playing a lock or unlock sound in response to receiving a lock or unlock command, the event mode parameter may include a first lock or unlock sound, and the normal mode parameter may be a second lock or unlock sound. In some embodiments, playing the lock or unlock sound may include playing the retrieved one of the first lock or unlock sound or the second lock or unlock sound.

In some embodiments, the vehicle function may include turning on interior lighting of a vehicle, the event mode parameter may be a first color, and the normal mode parameter may be a second color. In some embodiments, turning on the interior lighting of the vehicle may include turning on the interior lighting in the retrieved one of the first color or the second color.

In some embodiments, retrieving the event mode parameter may include retrieving the event mode parameter from a first memory location, retrieving the normal mode parameter may include retrieving the normal mode parameter from a second memory location.

In some embodiments, a vehicle is provided. The vehicle includes a device configured to perform a vehicle function and processing circuitry. The processing circuitry is configured to detect a vehicle function command, determine if an event mode is active, the event mode including one or more modifications to the vehicle function compared with a normal mode, in response to determining that the event mode is active, retrieve an event mode parameter, and in response to determining that the event mode is not active (e.g., the normal mode is active), retrieve a normal mode parameter. The processing circuitry is further configured to control the device to perform the vehicle function based on the retrieved event mode parameter or normal mode parameter.

In some embodiments, the processing circuitry may be configured, when determining if the event mode is active, to determine if a current time is within a predetermined time period associated with the event mode, and in response to determining that the current time is within the predetermined time period, activate the event mode.

In some embodiments, the processing circuitry may be further configured to determine, after activating the event mode, if the current time is still within the predetermined time period, and in response to determining that the current time is no longer within the predetermined time period, deactivate the event mode.

In some embodiments, the processing circuitry may be configured, when determining if the event mode is active, to determine if a current time is within a predetermined time period associated with the event mode, in response to determining that the current time is within the predetermined time period, display a prompt to activate the event mode, and in response to receiving instructions responding to the prompt to activate the event mode, activate the event mode.

In some embodiments, the device may include a display, the vehicle function may include displaying a representation of a pedestrian captured by a vehicle sensor, the event mode parameter may be a representation of a zombie, and the normal mode parameter may be a representation of a person. In some embodiments, the processing circuitry may be configured, when controlling the device to perform the vehicle function, to control the display to the retrieved one of the representation of the zombie or the representation of the person.

In some embodiments, the device may include a speaker, the vehicle function may include controlling the speaker to play a lock or unlock sound in response to receiving a lock or unlock command, the event mode parameter may be a first lock or unlock sound, and the normal mode parameter may be a second lock or unlock sound. In some embodiments, the processing circuitry may be configured, when controlling the device to perform the vehicle function, to control the speaker to play the retrieved one of the first lock or unlock sound or the second lock or unlock sound.

In some embodiments, the device may include interior lights, the vehicle function may include turning on interior lighting of a vehicle, the event mode parameter may include first instructions to display a first color, and the normal mode parameter may include second instructions to display a second color. In some embodiments, the processing circuitry may be configured, when controlling the device to perform the vehicle function, to control the interior lights to display the first color or the second color based on the retrieved one of the first instructions or the second instructions.

In some embodiments, retrieving the event mode parameter may include retrieving the event mode parameter from a first memory location, and retrieving the normal mode parameter may include retrieving the normal mode parameter from a second memory location.

In some embodiments, a method of performing a vehicle function is provided. The method includes receiving a command to perform the vehicle function, determining if a current time is within a predetermined time period, in response to determining that the current time is within the predetermined time period, retrieving a first file, and in response to determining that the current time is not within the predetermined time period, retrieving a second file. The method further includes performing the vehicle function based on the retrieved first or second file.

In some embodiments, the vehicle function may include displaying a representation of a pedestrian captured by a vehicle sensor, the first file may be a representation of a zombie, the second may be a representation of a person, displaying the representation of the pedestrian may include displaying the retrieved one of the representation of the zombie or the representation of the person.

In some embodiments, the vehicle function may include playing a lock or unlock sound in response to receiving a lock or unlock command, the first file may be a first lock or unlock sound, the second file may be a second lock or unlock sound, and playing the lock or unlock sound may include playing the retrieved one of the first lock or unlock sound or the second lock or unlock sound.

In some embodiments, the vehicle function may include turning on interior lighting of a vehicle, the first file may include first instructions to display a first color, the second file may include second instructions to display a second color, and turning on the interior lighting of the vehicle may include turning on the interior lighting in one of the first color or the second color based on the retrieved one of the first instructions or the second instructions.

In some embodiments, a vehicle is provided. The vehicle includes a plurality of domain controllers for performing functions of a vehicle, the plurality of domain controllers including a first domain controller, a second domain controller, and a third domain controller. The first domain controller may be configured to determine a current absolute time. The second domain controller may be configured to determine a current local time, based on the current absolute time and vehicle location information of the vehicle, determine if the current local time is within an event mode time period associated with an event mode, in response to determining that the current local time is within the event mode time period, send a enable signal to the third domain controller to enable the event mode, and in response to determining that the current local time is not within the event mode time period, send a disable signal to the third domain controller to disable the event mode and enable a normal mode. The third domain controller may be configured to enable the event mode in response to receiving the enable signal from the third domain controller. While the event mode is enabled, the third domain controller may be further configured to retrieve, in response to receiving a first vehicle function command, an event mode parameter corresponding to the first vehicle function, execute the first vehicle function based on the retrieved event mode parameter vehicle function based on the event mode parameter, and disable the event mode and enable the normal mode in response to receiving the disable signal from the second domain controller. While the normal mode is enabled, the third domain controller may be further configured to retrieve, in response to receiving the first vehicle function command, a normal mode parameter corresponding to the first vehicle function and execute the first vehicle function based on the retrieved normal mode parameter vehicle function.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 5 shows an exemplary interface once the Halloween event mode is enabled, in accordance with some embodiments of the present disclosure;

FIG. 6 shows examples of other vehicle functions that are modified when the Halloween event mode is enabled, in accordance with some embodiments of the present disclosure;

FIGS. 8A and 8B show examples of default yeti icon and the Halloween yeti icon that may be displayed during the respective modes, in accordance with some embodiments of the present disclosure;

FIGS. 9A and 9B show examples of Halloween lock and unlock sounds and of default or normal lock and unlock sounds that may be played during the respective modes, in accordance with some embodiments of the present disclosure;

DETAILED DESCRIPTION

Figure 1:
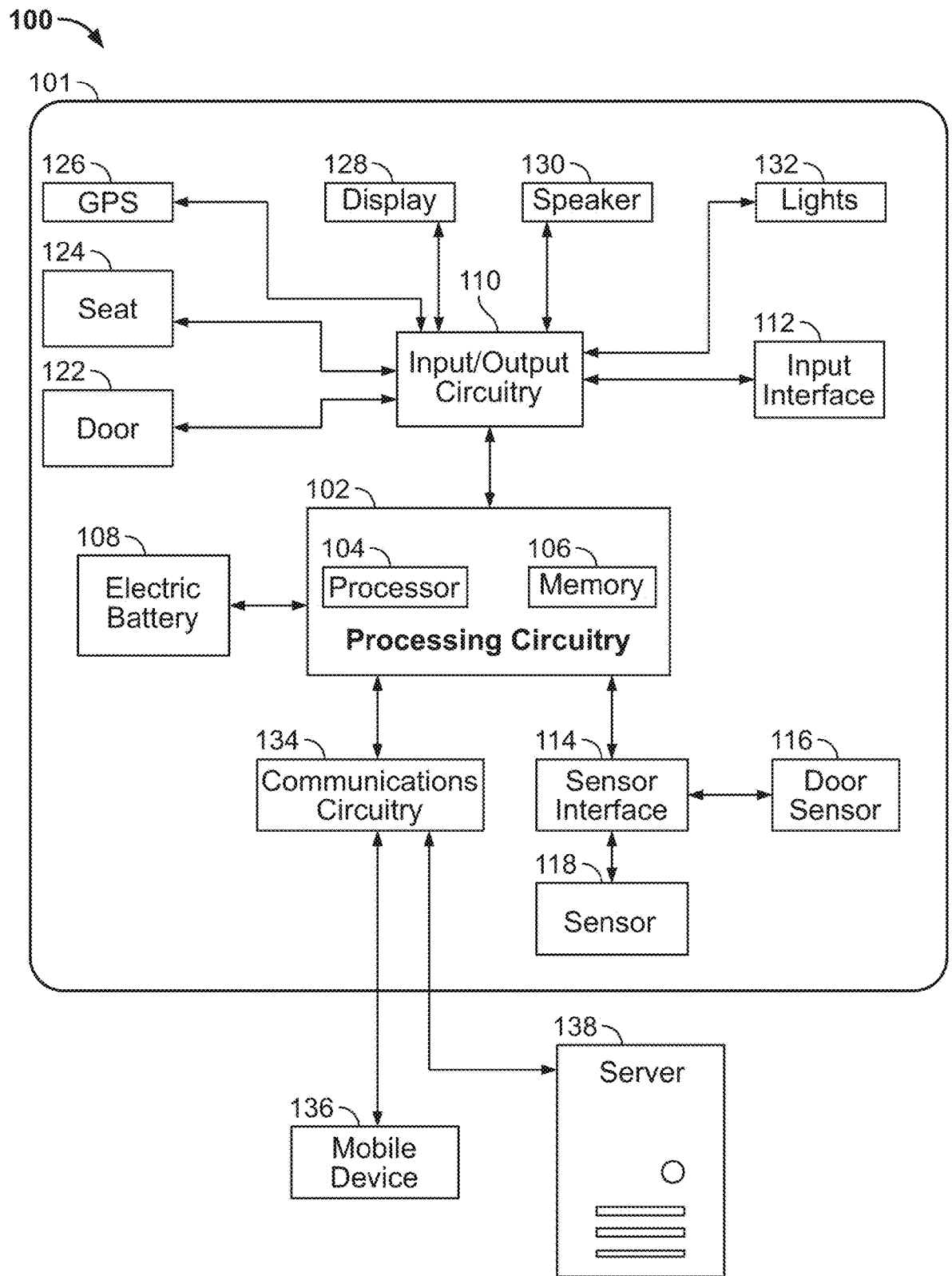
FIG. 1 shows a block diagram of components of a system of a vehicle for providing transient vehicle features of vehicle functions, in accordance with some embodiments of the present disclosure.

FIG. 1 shows a block diagram of components of a system 100 of vehicle 101 for providing transient vehicle features of vehicle functions, in accordance with some embodiments of the present disclosure. Vehicle 101 may be a car (e.g., a coupe, a sedan, a truck, an SUV, a bus), a motorcycle, an aircraft (e.g., a drone), a watercraft (e.g., a boat), or any other type of vehicle. Vehicle 101 may be an electric vehicle, internal combustion engine vehicle, hybrid vehicle, or any other type of vehicle.

Vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection.

Processing circuitry 102 may be communicatively connected to electric battery 108, which may be configured to provide power to one or more of the components of vehicle 101 during operation. Sensor 118 (e.g., a camera, radar module, lidar module, or any suitable image sensor) may be communicatively coupled to processing circuitry 102 (e.g., by way of sensor interface 114) and positioned at any suitable position in an interior or exterior of vehicle 101. In some embodiments, sensor 118 may capture images of the area around vehicle 101 in real time to identify pedestrians, other vehicles, obstacles, lane markings, etc., which may be displayed on a navigation interface. In some embodiments, sensor 118 may capture images of destinations traveled to by vehicle 101 to identify the environment in which vehicle 101 is parked (e.g., an outdoor parking lot, an indoor parking lot, a garage, the number of nearby vehicles, etc.). Processing circuitry 102 may be communicatively connected to input interface 112 (e.g., a steering wheel, a touch screen display, buttons, knobs, a microphone or other audio capture device, etc.) via input/output circuitry 110. In some embodiments, a driver of vehicle 101 may be permitted to select certain settings in connection with the operation of vehicle 101 (e.g., passive entry settings). In some embodiments, processing circuitry 102 may be communicatively connected to Global Positioning System (GPS) system 126 of vehicle 101, where the driver may interact with the GPS system via input interface 112. GPS system 126 may be in communication with multiple satellites to ascertain the vehicle's location and provide navigation directions to processing circuitry 102. As another example, the positioning device may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with the vehicle (e.g., a location of a home of the user stored in memory 106).

Processing circuitry 102 may be communicatively connected to door 122, seat 124, display 128, speaker 130, and lights 132, by way of input/output circuitry 110. In some embodiments, input/output circuitry 110 may comprise one or more domain controllers, as explained in further detail below with reference to FIG. 2. Display 128 may be located at a dashboard of vehicle 101 and/or a heads-up display on a windshield of vehicle 101. For example, an interface for GPS system 126 or an interface of an infotainment system may be generated for display, and display 128 may comprise an LCD display, an OLED display, an LED display, or any other type of display. In some embodiments, display 128 may provide a driver with a navigation interface, an entertainment interface, a backup camera interface, etc. In some embodiments, the navigation interface may generate, in real-time, a simplified rendering (e.g., animation) of objects around vehicle 101 that are captured by sensor 118 (e.g., people, other vehicles, lane markings, etc.). Speaker 130 may be located at any location within the cabin of vehicle 101, e.g., at the dashboard of vehicle 101, on an interior portion of the vehicle door. In some embodiments, speaker 130 may be located outside the cabin of vehicle 101 and provide audio that is audible outside of vehicle 101 (e.g., a personalized greeting during a welcome action of the vehicle, a door lock/unlock sound, etc.). Lights 132 may be interior or exterior lights that provide light from inside or outside of vehicle 101 (e.g., during a welcome action of the vehicle). Processing circuitry 102 may also be communicatively connected (e.g., by way of sensor interface 114) to door sensor 116 (e.g., which may sense an open door of vehicle 101).

Processing circuitry 102 may be in communication (e.g., via communications circuitry 134) with mobile device 136 (e.g., of the driver of vehicle 101). Such connection may be wired or wireless. In one example, such a connection is a two-way connection via the BLE standard (e.g., via a BLE transceiver). In some embodiments, communications circuitry 134 and/or mobile device 136 may be in communication with one or more servers 138 (e.g., over a communications network such as, for example, the Internet).

It should be appreciated that FIG. 1 only shows some of the components of vehicle 101, and it will be understood that vehicle 101 also includes other elements commonly found in vehicles (e.g., vehicles), e.g., a motor, brakes, wheels, wheel controls, turn signals, windows, doors, etc. Vehicle 101 may also include a plurality of domain controllers and a central controller for performing various vehicle functions (e.g., unlocking a door of vehicle 101 and playing an unlock sound in response to receiving an unlock command), as explained in greater detail below with reference to FIG. 2.

Figure 2:
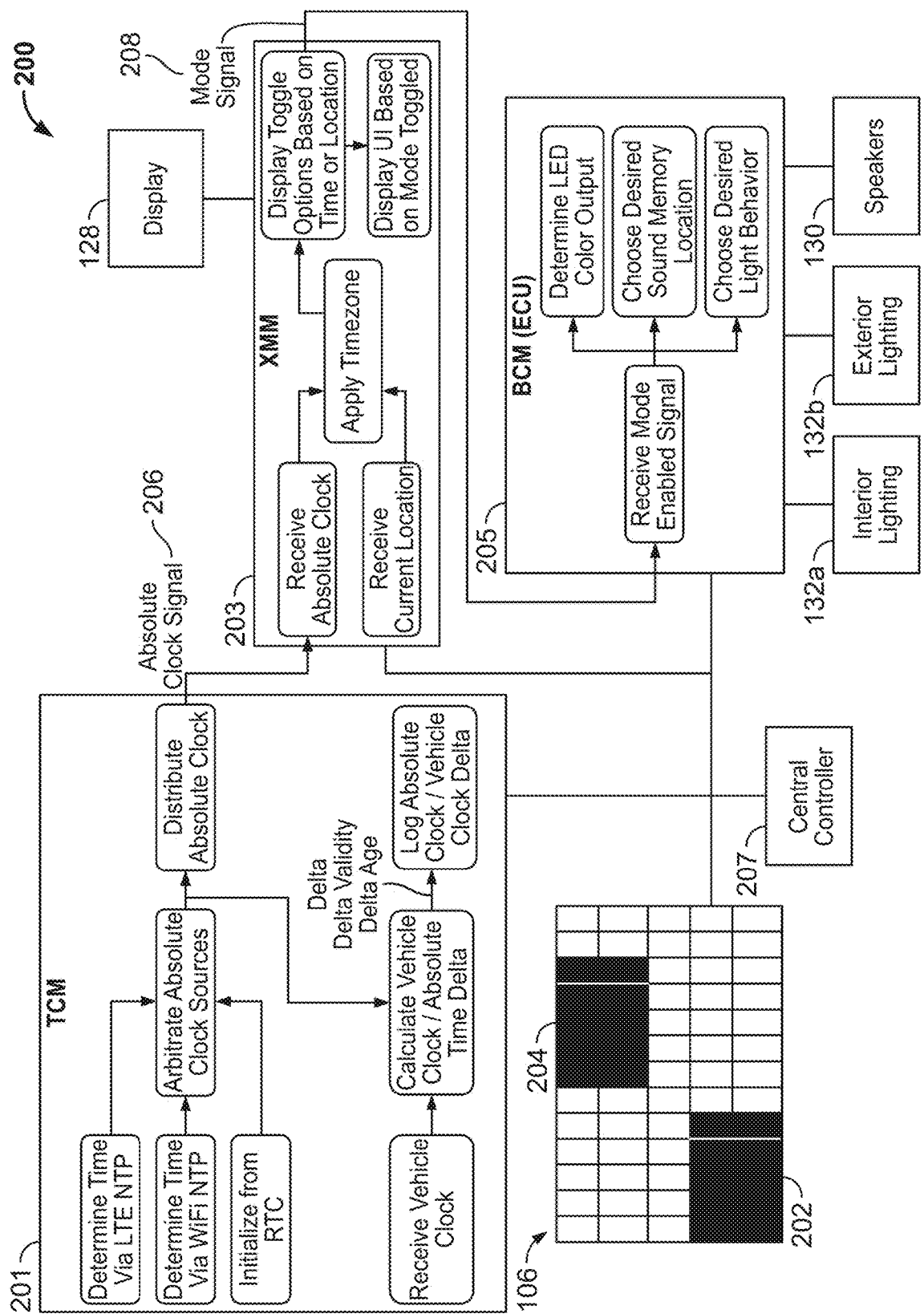
FIG. 2 shows a block diagram of an illustrative control system comprising a plurality of domain controllers (e.g., modules) for controlling certain functions of a vehicle, in accordance with some embodiments of the present disclosure.

FIG. 2 shows a block diagram of illustrative control system 200 comprising a plurality of domain controllers (e.g., modules) for controlling certain functions of vehicle 101, in accordance with some embodiments of the present disclosure. The illustrative control system may correspond to certain elements illustrated in FIG. 1 (e.g., processing circuitry 102, sensor interface 114, input/output circuitry 110, etc.). In some embodiments, control system 200 may include a central gateway (e.g., central controller 207) along with other domain controllers for controlling certain other functions of vehicle 101. Control system 200 may implement an event modes application to provide transient vehicle features of certain vehicle functions during a predetermined time window (e.g., an event mode time period). That is, the events mode application may include one one or more modifications to the vehicle function compared with a normal mode application (e.g., associated with a normal mode). In one approach, the provided transient vehicle features may be related to the predefined time period. For example, Halloween-themed vehicle features may be provided for a time period around Halloween. In some embodiments, the events mode application may coordinate time-based, geo-based, and/or user-based alterations to default vehicle features, lights, and sounds. As shown, the domain controllers may include, e.g., telematics control module (TCM) 201, experience management module (XMM) 203, and body control module (BCM) 205. However, these are only some examples, and the domain controllers may include other suitable vehicle modules such an acoustic vehicle alert system (AVAS).

The plurality of domain controllers and the central gateway may be implemented (using software running on one or more general purpose or specialized processors (e.g., electronic control units (ECUs) or electronic control modules (ECMs)). For example, in one embodiment, as shown, control system 200 may be implemented by a plurality of devices (modules) and a plurality of software components. As shown, certain components of control system 200 may communicate over a communication network using any suitable protocol such as a local interconnect network (LIN) protocol, a C-Bus protocol, Ethernet, by internet communication, etc.

Central controller 207 and one or more of the plurality of domain controllers (e.g., TCM 201, XMM 203, and BCM 205) may implement different types of suitable functions for the operation of vehicle 101. For example, central controller 207 and one or more of the plurality of domain controllers implement sense functions (e.g., for monitoring or detecting a condition), compute functions (e.g., for computing an event mode or computing a value-based input from the sense functions), and act functions (e.g., to send a notification or command or broadcast an event mode, or to implement control). For example, as shown, BCM 205 may be implemented as a device (e.g., including an ECU) and may include a plurality of sense functions, including a door ajar status function and a door lock status function.

As shown, TCM 201 may determine the absolute time (e.g., Greenwich Mean Time). For example, TCM 201 may determine the absolute time based on data inputs, LTE, Wi-Fi or by any other suitable method (e.g., by executing sense functions). TCM 201 may also calculate vehicle clock/absolute time data based on the determined absolute time and a received vehicle clock. TCM 201 may implement an act function to log the absolute time and vehicle clock delta (e.g., in memory 106). TCM 201 may also communicate the determined absolute time to XMM 203 (e.g., by absolute clock signal 206), which may determine the local time zone (e.g., the current time) based on the current location of vehicle 101 (e.g., based on received GPS data or based on any other suitable method). If the current time is within a preset time period of an event mode stored in memory (e.g., memory 106), XMM 203 may generate for display (e.g., on display 128), a user option to enable the event mode, toggle a feature, or enable certain time-limited functionality, as shown in further detail with reference to FIG. 3. In response to receiving a user confirmation to enable the event mode, XMM 203 updates the event mode to enabled and sends a system signal to other domain controllers (e.g., ECU) to enable the event mode. For example, XMM 203 sends a system signal (e.g., mode signal 208) to BCM 205 indicating that the event mode is enabled. Based on the enabled event mode, the respective domain controllers modify features of vehicle functions based on the enabled event mode. For example, as shown, BCM 205 may determine an LED color output or a desired light behavior of interior lighting 132a or exterior lighting 132b of the vehicle or designate a memory location to retrieve sound to be played through speakers 130 (e.g., in response to certain events), based on the enabled event mode. That is, while the event mode is active during the event mode time period, BCM 205 may perform certain vehicle functions differently (e.g., with respect to a normal mode or a default mode), as explained in greater detail below. Once the event mode time period expires, the operation of BCM 205 and other domain controllers may automatically return to a normal or default mode. In some embodiments, each of the domain controllers associated with an event mode may set a vehicle parameters retrieval mode to the event mode when the event mode is active and revert the vehicle parameters retrieval mode to a normal mode when the event mode is no longer active. In some embodiments, the current vehicle parameters retrieval mode may control the parameters (e.g., settings, sounds, images, etc.) that are retrieved when certain vehicle functions are performed (e.g., in response to receiving a command to perform the vehicle function or in response to the vehicle function being called). For example, when the vehicle is locked (e.g., a lock command is received), different lock sounds may be retrieved based on the current setting of the vehicle parameters retrieval mode. In one example, first memory location 202 in memory 106 stores a first set of vehicle parameters (e.g., one or more first files) associated with an event mode, and second memory location 204 in memory 106 stores a second set of vehicle parameters (e.g., one or more second files) associated with a normal mode. In some embodiments, each of the domain controllers may store one or more sets of vehicle parameters in a local memory. In some embodiments, memory 106 may reside in the central controller or may be distributed in one or more domain controllers. In some embodiments, memory 106 comprises a plurality of separate memory and the first set of vehicle parameters associated with an event mode may be stored in a first memory and a second set of vehicle parameters may be stored in a second memory different than the first memory. In some embodiments, each of the multiple memories may have different access or security levels. For example, the second set of vehicle parameters may be stored in a memory or memory location that is more secure than a memory or memory location storing the second set of vehicle parameters. In some embodiments, one or more vehicle parameters may be retrieved from a server.

In some embodiments, XMM 203 may automatically enable an event mode at the start of the event mode time period, without displaying a prompt. For example, vehicle 101 may track a baseline of a user's past interactions with event modes, store this information in a user profile, and make a determination of whether to automatically enable an upcoming event mode or prompt the user to enable the upcoming event mode based on the user profile. In some embodiments, XMM 203 may end an enabled event mode early, by determining dissatisfaction by the user with an event mode (e.g., by tracking changes in the baseline of the user's past interactions).

In some embodiments, XMM 203 may temporarily pause or disable an enabled event mode (e.g., based on safety conditions and vehicle state). For example, certain features of an event mode may only be available when vehicle 101 is not in motion (e.g., parked) or when traveling below a certain speed. Example of event modes are described in greater detail below with reference to FIGS. 3-7.

Figure 3:
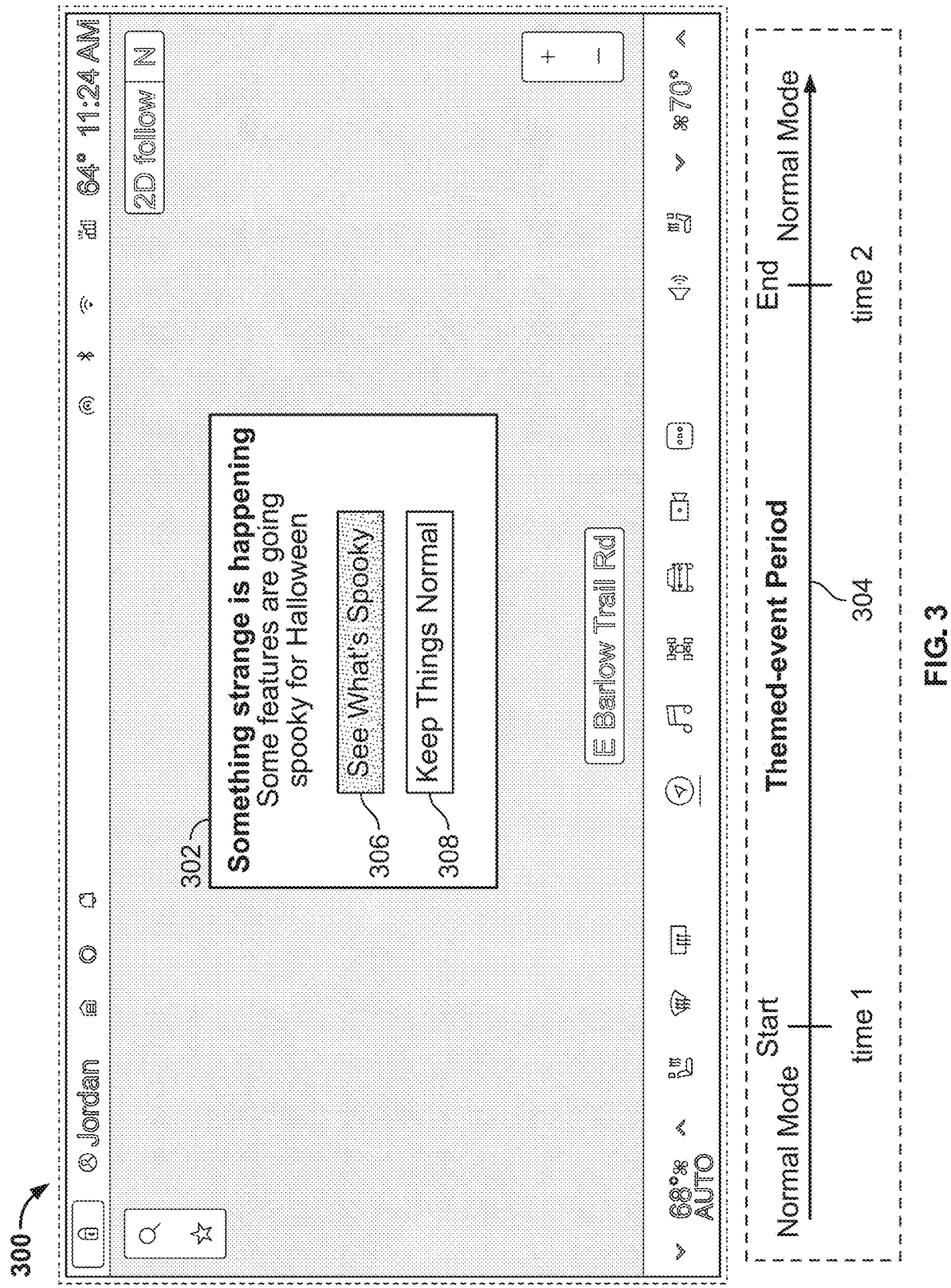
FIG. 3 shows an exemplary interface for enabling an event mode, in accordance with some embodiments of the present disclosure.

FIG. 3 shows an exemplary interface 300 for enabling an event mode, in accordance with some embodiments of the present disclosure. As shown, the event mode may be defined by themed-event period 304 beginning at time 1 and ending at time 2. In one example, the event mode may be a Halloween event mode having a themed-event period corresponding to the holiday of Halloween (e.g., beginning on Oct. 29, 2022, at 1 PM local time and ending on Nov. 1, 2022, 2 PM local time). Thus, the time when the event mode is available to a vehicle may depend on the time zone the vehicle is currently located in. In some embodiments, it may be advantageous to make certain event modes available at the same time across multiple time zones. In response to the current time (e.g., the local time determined by XMM 203) entering the event mode time period, XMM 203 may display a prompt 302 to explore the event or dismiss the event. Interface 300 may be generated for display, by way of processing circuitry 102 and input/output circuitry 110, at an in-vehicle infotainment screen of display 128 (e.g., a heads-up display and/or at one or more dashboard displays depicting graphical user interfaces). In some embodiments, the interface 300 may be generated for a display of mobile device 136 of a user of electric vehicle 101 (e.g., a driver). In response to a user selecting an option to "See What's Spooky" (option 306), interface 400 of FIG. 4 may be displayed. Otherwise, in response to a user selecting an option to "keep things normal" (option 308), the interface returns to normal and the event mode (e.g., the Halloween event mode) is not enabled.

Figure 4:
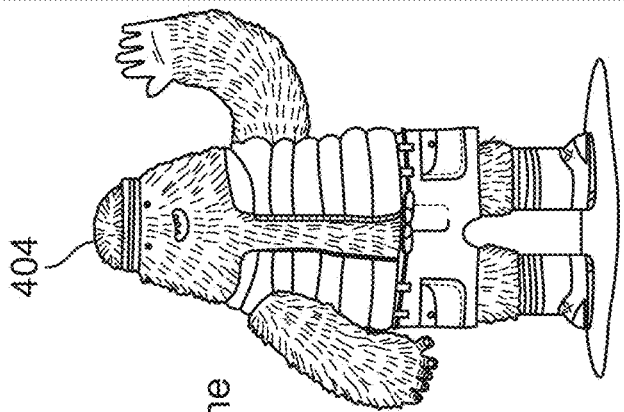
FIG. 4 shows an exemplary interface for enabling the Halloween event mode, in accordance with some embodiments of the present disclosure.

FIG. 4 shows an exemplary interface 400 for enabling the Halloween event mode (e.g., a "Halloween Theme"), in accordance with some embodiments of the present disclosure. As shown, the interface 400 includes a user-selectable option 402 to enable the Halloween event mode. As shown, the Halloween event mode includes a Halloween theme that modifies the normal or default operation of certain sounds, lights, and visuals of vehicle 101, as explained in further detail below. As shown, the interface 400 may display an icon 404 of a Yeti. Interface 400 may also indicate a current user (e.g., user 406) associated with vehicle 101 (e.g., "Jordan"). In some embodiments, the Halloween event mode may be enabled automatically for certain users (e.g., based on the user profile of the user). In response to a user selecting option 402 to enable the Halloween theme, the Halloween event mode is enabled and interface 500 of FIG. 5 may be displayed. Additionally, with reference to FIG. 2, XMM 203 may update an event mode status or vehicle parameters retrieval mode from normal to "Halloween event mode" and send a signal to BCM 205 indicating that the Halloween event mode is active.

Figure 5:
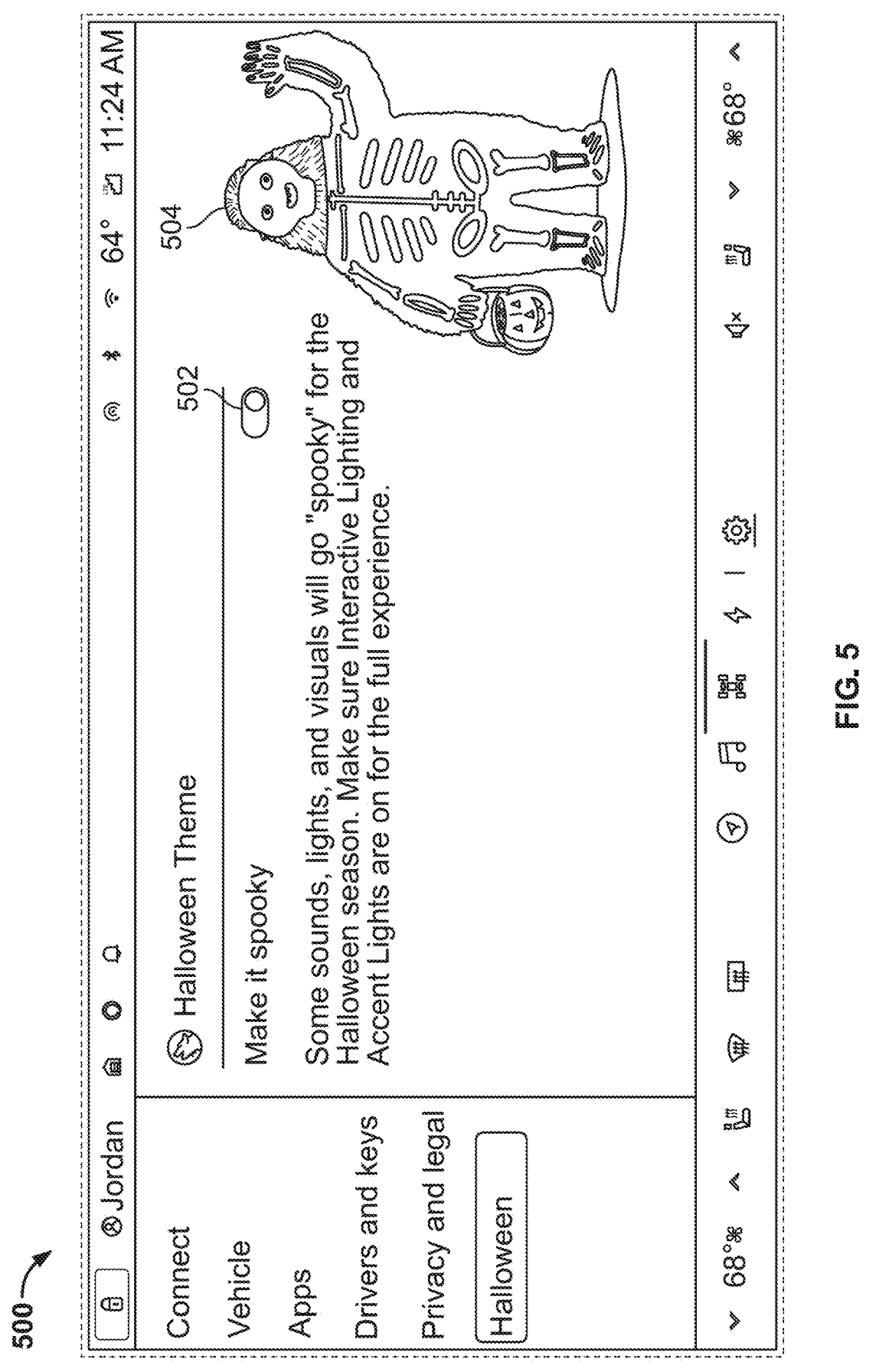

FIG. 5 shows an exemplary interface 500 once the Halloween event mode is enabled, in accordance with some embodiments of the present disclosure. As shown, once the Halloween event mode is enabled (502 toggled to enabled), XMM 203 may change the displayed icon 404 of the Yeti to icon 504 of a Halloween-themed Yeti. For example, XMM 203 may update a memory location associated with displaying the icon from a first memory location (e.g., associated with the normal Yeti of FIG. 4) to a second memory location (e.g., associated with the Halloween-themed yet of FIG. 5). Thus, when instructions to display a Yeti are received, XMM 203 may retrieve the Yeti from one of the first or second memory locations, based on the state of the Halloween event mode.

FIG. 6 shows examples of other vehicle functions that are modified when the Halloween event mode is enabled (e.g., as compared with a normal mode), in accordance with some embodiments of the present disclosure. As shown, when the Halloween event mode (e.g., themed-event mode) is enabled, BCM 205 may modify lock/unlock sounds and lighting, as well as the interior lighting of vehicle 101. For example, when an unlock command is received, BCM 205 may retrieve a howl sound ("unlock howl") from a first location in memory (e.g., memory 106) and control exterior speakers (e.g., speakers 130) to play the sound. In contrast, during a normal mode, BCM 205 may not play any sound when an unlock command is received.

Similarly, BCM 205 may retrieve and play a hoot sound ("lock hoot") when a lock command is received (e.g., instead of a chirp ("lock chirp") when normal mode is enabled). BCM 205 may also control front light bar 332 of vehicle 101 to display green lighting when either a lock or unlock command is received (e.g., instead of white lighting when normal mode is enabled). In some embodiments, one or more of the event mode features may be synchronized with each other. For example, BCM 205 may control front light bar 332 to display green lighting in an exterior lighting animation that is synchronized with either the unlock howl or the look hoot. For example, the themed lock/unlock sound and front light bar 332 may vary the light intensity (e.g., of the green lighting) in accordance with the sound wave of the themed lock/unlock sound. Additionally, BCM 205 may also control interior lighting 132b of vehicle 101 to display a red color (e.g., instead of white lighting when normal mode is enabled). Of course, these are just examples, and different features of vehicle functions may be provided by different event modes.

Additionally, when the Halloween event mode is enabled, XMM 203 may display (on display 128) a zombie animation rendering in place of a default rendering of pedestrians captured by sensor 118. In some embodiments, the "zombie pedestrians" may include subtle movements that do not correspond to the actual movements of pedestrians around vehicle 101. For example, although the location and travel of the pedestrians may be accurately rendered, additional zombie-like animations may be included (e.g., dragging a leg, or holding arms up in front of their body). Put another way, as explained in greater detail below with reference to FIGS. 7A-7C, during the Halloween event mode, rendering animations of pedestrians around vehicle 101 on display 128, may be updated by replacing a default pedestrian icon with a zombie pedestrian icon (e.g., by retrieving icons from different locations in memory).

Figure 7A:
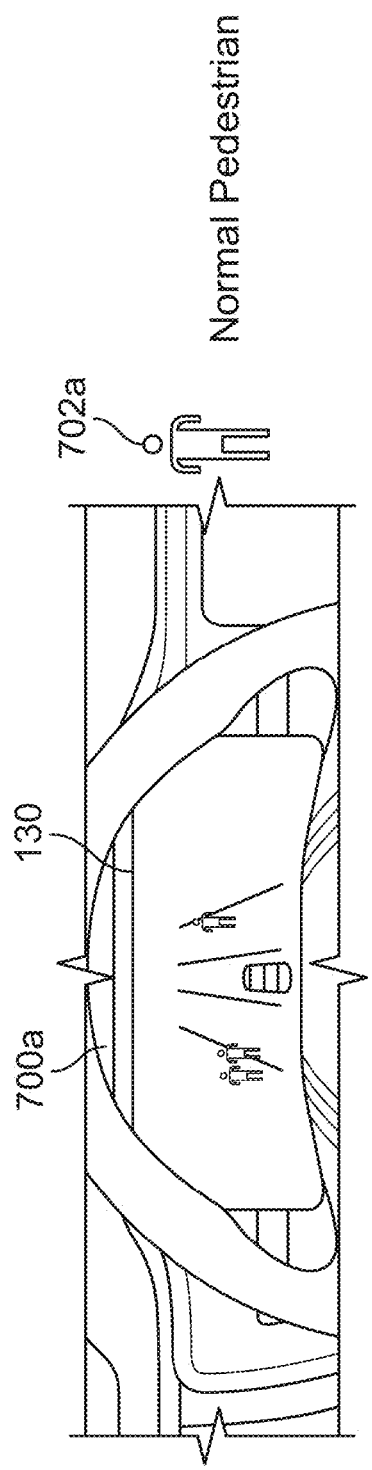
FIGS. 7A-7C show examples of a default pedestrian icon and a zombie pedestrian icon that may be displayed during the respective modes, in accordance with some embodiments of the present disclosure.
Figure 7B:
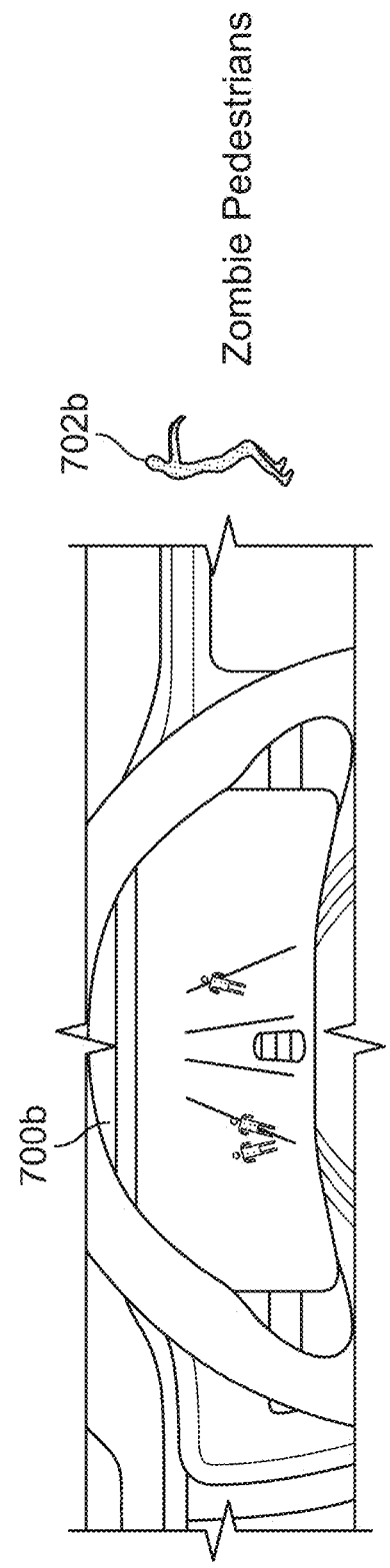
Figure 7C:
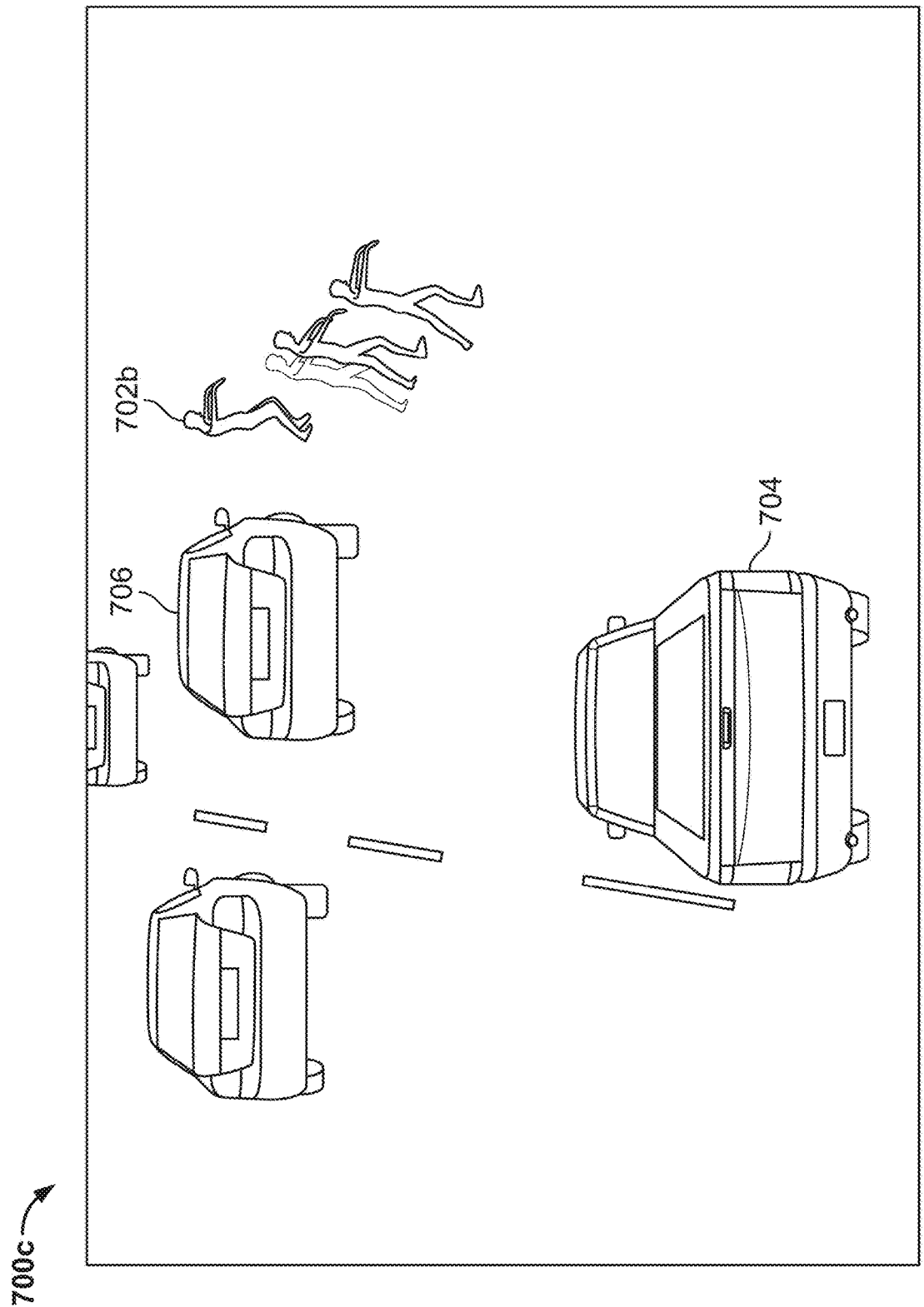

FIGS. 7A-7C show examples of a default pedestrian icon and a zombie pedestrian icon that may be displayed during the respective modes, in accordance with some embodiments of the present disclosure. As shown in FIG. 7A, during a normal mode, pedestrians captured by sensor 118 are displayed with default pedestrian icon 702a on interface 700a displayed by display 128. As shown in FIG. 7B, during the Halloween event mode, default pedestrian icon 702a is replaced with zombie pedestrian icon 702b. Thus, pedestrians captured by sensor 118 may be rendered as zombies on interface 700b. FIG. 7C shows another example interface (interface 700c) that is displayed when the Halloween event mode is enabled. FIG. 7C may be a more detailed view of interface 700b of FIG. 7B. As shown, pedestrians captured by sensor 118 may be rendered by zombie pedestrian icon 702b. As detailed above, zombie pedestrian icon 702b may include zombie-like animations. Interface 700c may also display icon 704 representing vehicle 101 and icon 706 representing other vehicles captured by sensor 118.

FIGS. 8A and 8B show examples of a default yeti icon and the Halloween yeti icon that may be displayed during the respective modes, in accordance with some embodiments of the present disclosure. As shown in FIG. 8A, during a normal mode, default yeti icon 800a may be displayed. For example, default yeti icon 800a may be displayed as icon 404 on interface 400 shown in FIG. 4. As shown in FIG. 8B, during the Halloween event mode, default yeti icon 800a may be replaced with Halloween yeti icon 800b. For example, Halloween yet icon 800b may be displayed as icon 504 on interface 500 shown in FIG. 5.

FIGS. 9A and 9B show examples of Halloween lock and unlock sounds and of default or normal lock/unlock sounds that may be played during the respective modes, in accordance with some embodiments of the present disclosure. As shown, when the normal mode is active, BCM 205 may be set to not play an unlock sound (e.g., when unlock function 902 is called) or an approach sound when a user is detected approaching vehicle 101 (e.g., when approach function 906 is called). BCM 205 may be set to play a bird chirp when a lock command is received (e.g., when lock function 904 is called) when normal mode is enabled. During normal mode, certain event mode parameters that were enabled during an event mode, but were automatically disabled at the end of the event mode time period, may be enabled by a user through a menu. For example, if a user decides they enjoy the howl sound that is played when the Halloween event mode is enabled, the user may be able to reenable this sound after the Halloween event mode is disabled when the Halloween event mode time period expires and the unlock sound returns to the default of not playing an unlock sound (e.g., if this event mode parameter is made available after the event mode time period). However, other features of the Halloween event mode (e.g., the owl hoot when a user approaches vehicle 101) may be locked and unavailable after the Halloween event mode is disabled.

Although a Halloween event mode is illustrated and described, it should be understood that other event modes with other corresponding event mode periods may be provided. For example, a plurality of different event modes may be stored in memory. In some embodiments, additional event modes may be added in advance by an over-the-air (OTA) update. Additionally, it should be understood that certain event modes may be geographically specific or limited or personalized for different users. For example, a birthday event mode may be provided to a user on the day of their birthday (e.g., retrieved from a user profile). In some embodiments, the user profile may be retrieved from a server (e.g., a server associated with the vehicle manufacturer). In a birthday event mode, icons with a birthday theme may be displayed in place of default mode icons. Additionally, in some approaches, a personalized approach sound may be played (e.g., a happy birthday greeting). In another example, a treasure hunt event mode may be provided. In one example, the treasure hunt mode may be automatically enabled when the vehicle reaches a specific secret location during a specific time period. For example, clues to a location may be displayed, and if a user correctly reaches the secret location, special features of vehicle functions may be temporarily unlocked (e.g., lock/unlock sounds, UI display icons, etc.). In another example, a vehicle beta event mode is provided. In this mode, certain trial versions for paid features or functionality of vehicle 101 may be unlocked, without requiring updates or installation of new software (e.g., by an OTA update). In one approach, the vehicle beta event mode may be used to gauge interest in new features or functions. In some embodiments, users may opt in or out of event modes. In some embodiments, because certain features and functionalities may be provided by enabling access to different memory locations during an event mode time period, the number of OTA updates may be reduced, an excessive number of options may be avoided from being displayed on navigation interfaces, and user enjoyment may be improved, without requiring a user to manually update features of vehicle functions during different time periods (e.g., holidays). In some embodiments, one or more vehicle parameters associated with an event mode may be retrieved from a server.

Figure 10:
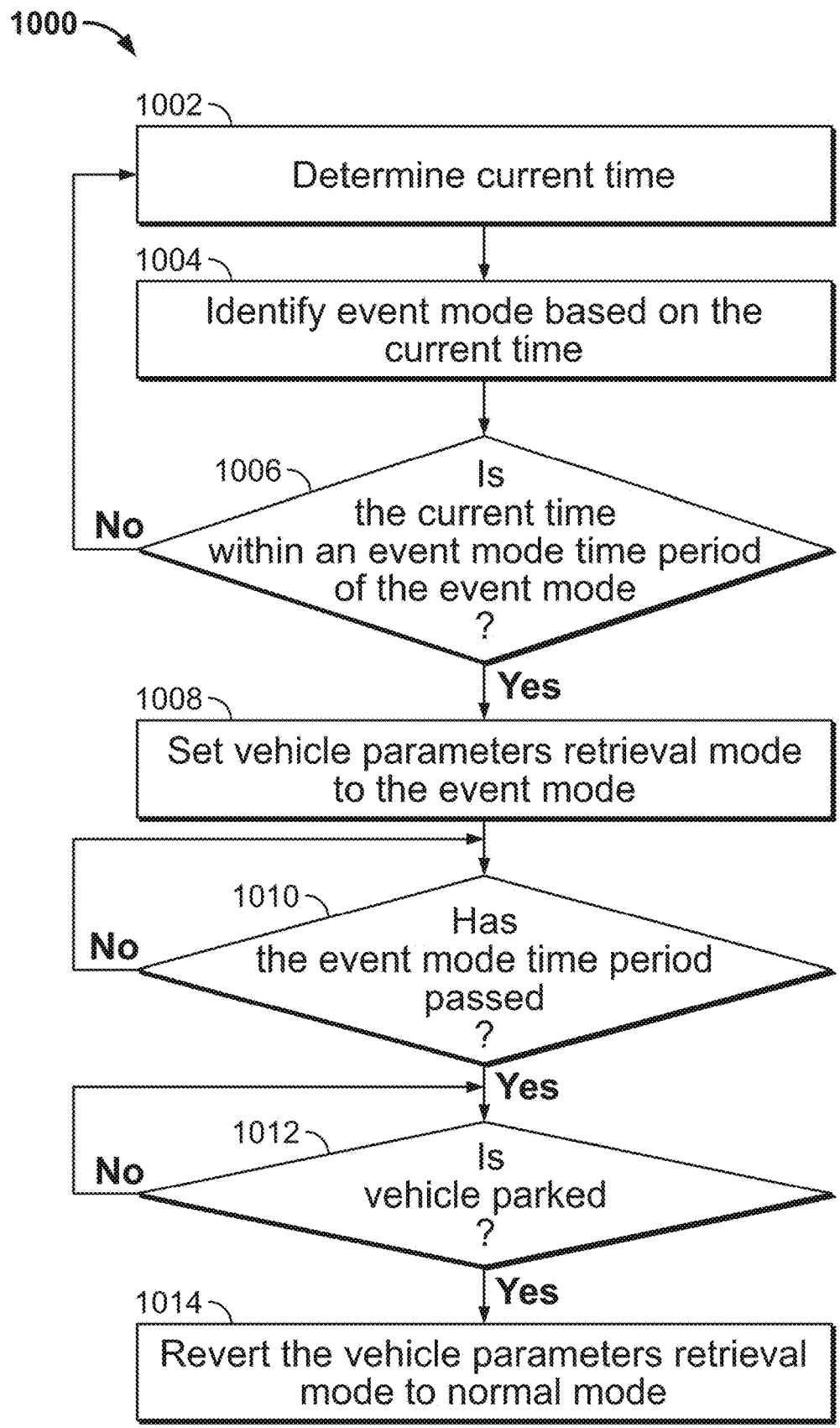
FIG. 10 shows a flowchart of an illustrative process for enabling an event mode during an event mode time period, in accordance with some embodiments of the present disclosure.

FIG. 10 shows a flowchart of an illustrative process 1000 for enabling an event mode during an event mode time period, in accordance with some embodiments of the present disclosure. Process 1100 may be performed at least in part by processing circuitry 102.

At 1002, processing circuitry 102 determines a current time. For example, processing circuitry 102 determines a current local time based on the location of the vehicle. In one approach, processing circuitry 102 determines the current local time based on an absolute time and the current location.

At 1004, processing circuitry 102 identifies an event mode based on the current time. For example, processing circuitry 102 may search for event mode time periods based on the current time and identify an event mode time period corresponding to the current time. In one approach, multiple event mode time periods (e.g., each associated with different event modes) may be stored in a memory, and a specific event mode may be identified by searching for time periods that include the current time (e.g., or that are approaching based on the current time. In some embodiments, processing circuitry 102 may periodically search for upcoming event mode time periods (e.g., once a day).

At 1006, processing circuitry 102 determines if the current time is within an event mode time period of the identified event mode. For example, processing circuitry 102 may determine if the event mode time period has started by comparing the start time of the event mode time period to the current time (e.g., and the end time). In response to determining that the current time is not within the event mode time period of the identified event mode ("No" at 1006), process 1000 returns to 1002. Otherwise, ("Yes" at 1006), process 1000 proceeds to 1008. In some embodiments, the start and end times of the event mode time period may be used to create activation and deactivation triggers such that when the current time reaches the time of the triggers, the event mode is engaged and disengaged. In some embodiments, the activation and deactivation triggers may be used to prompt a user to enable or disable an event mode time period.

At 1008, processing circuitry 102 sets a vehicle parameters retrieval mode to the event mode. The current vehicle parameters retrieval mode may control the parameters (e.g., settings, sounds, images, etc.), that are retrieved when certain vehicle functions are performed. For example, by setting the vehicle parameters retrieval mode to the events mode, event mode parameters corresponding to the event mode may be retrieved for performing certain vehicle functions (e.g., instead of retrieving normal mode parameters when a normal vehicle parameters retrieval mode is active). In some embodiments, the vehicle parameters for an event mode may change both user-selectable settings (e.g., ambient light color, lock and unlock sounds or visualizations, whether or not unlock or lock sounds are played, etc.) and other vehicle features that are not user selectable (e.g., representations of pedestrians). In some embodiments, as illustrated in FIG. 3, a prompt may be displayed before 1008 and process 1000 only proceeds to 1008 if the user selects the prompt to proceed.

At 1010, processing circuitry 102 determines if the event mode time period has passed. That is, processing circuitry 102 may determine if the current time is still within the event mode time period. In response to determining that the event mode time period has not passed ("No" at 1010), processing circuitry 102 continues to monitor the current time to determine if the current time is still within the event mode time period. Otherwise ("Yes" at 1010), process 1100 proceeds to 1012.

At 1012, processing circuitry 102 determines if the vehicle is parked. In response to determining that the vehicle is not parked ("No" at 1012), processing circuitry 102 continues to monitor vehicle 101. Otherwise ("Yes" at 1012), process 1000 proceeds to 1014. By monitoring whether the vehicle is still traveling when the event mode time period expires (e.g., the current is no longer within the event mode time period, processing circuitry 102 may avoid making any changes to the display or any other vehicle functions that may distract the driver).

At 1014, processing circuitry 102 reverts the vehicle parameters retrieval mode to the normal mode. In some embodiments, processing circuitry 102 may present a screen to a user asking if the user would like to keep one or more of the event mode parameters. In some embodiments, only some of the event mode parameters may be selected (e.g., interior ambient lighting for the event mode may be selectable by a user, but zombie representations of pedestrians may not be selectable).

Figure 11:
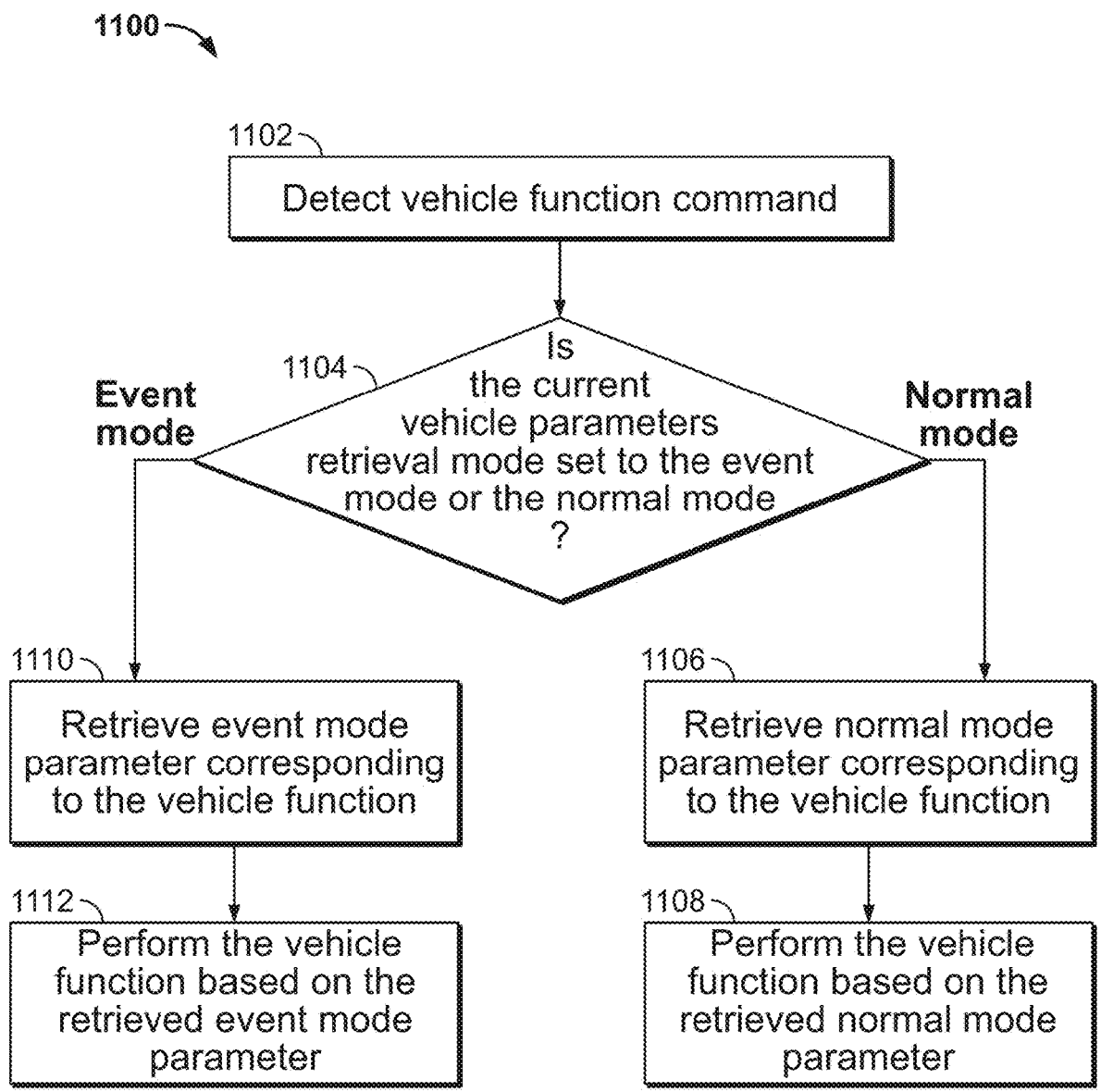
FIG. 11 shows a flowchart of an illustrative process for performing a vehicle function based on the current vehicle parameters retrieval mode, in accordance with some embodiments of the present disclosure.

FIG. 11 shows a flowchart of an illustrative process 1100 for performing a vehicle function based on the current vehicle parameters retrieval mode, in accordance with some embodiments of the present disclosure. Process 1100 may be performed at least in part by processing circuitry 102.

At 1102, processing circuitry 102 detects a vehicle function command. For example, processing circuitry 102 may detect a received vehicle function command (e.g., receive a lock/unlock signal), may detect a function call of the vehicle function (e.g., performed automatically by an application, domain controller), or may detect the vehicle function command in any other suitable manner.

At 1104, processing circuitry 102 determines if the current vehicle parameters retrieval mode is set to the event mode (e.g., event operating mode) or the normal mode (e.g., normal operating mode). In response to determining that the current vehicle parameters retrieval mode is set to the normal mode ("Normal Mode" at 1104), process 1100 proceeds to 1106. Otherwise ('Event Mode"), process 1100 proceeds to 1110.

At 1106, processing circuitry 102 retrieves a normal mode parameter corresponding to the vehicle function. For example, as illustrated in FIG. 6, in response to detecting or receiving a received lock signal (e.g., when the normal mode is active), processing circuitry 102 may retrieve a normal mode sound for locking a door (e.g., a lock "chirp").

At 1108, processing circuitry 102 may perform the vehicle function based on the retrieved normal mode parameter. For example, in response to retrieving the lock chip, processing circuitry 102 may control a speaker (e.g., speaker 130) to play the retrieved lock chirp.

At 1110, processing circuitry 102 retrieves an event mode parameter corresponding to the vehicle function. In some embodiments, the event mode parameter may be stored in a different memory or memory location than a normal mode parameter (e.g., associated with a normal operating mode where the processor retrieves default instructions or files in order for the vehicle to perform standard vehicle functions or operating characteristics). For example, as illustrated in FIG. 6, in response to detecting or receiving a lock signal (e.g., when the event mode is active), processing circuitry 102 may retrieve an event mode sound for locking the door (e.g., a lock "hoot") from a second memory location instead of retrieving a normal mode sound (e.g., a lock "chirp") from a first memory location when the event mode is not active (e.g., a normal operating mode is active). In some embodiments, more than one parameter may be retrieved for performing a vehicle function.

At 1112, processing circuitry 102 may perform the vehicle function based on the retrieved event mode parameter. For example, in response to retrieving the lock hoot, processing circuitry 102 may control a speaker (e.g., speaker 130) to play the retrieved lock hoot. In some embodiments, multiple vehicle functions may be performed for a signal command. For example, in response to receiving a lock command when the event mode is active, processing circuitry 102 may control the speaker to play the retrieved lock hoot and control exterior lighting (e.g., a vehicle light bar) to emit light. In some embodiments, an exterior lighting animation may be synchronized with a lock or unlock sound (e.g., the light intensity may be varied in accordance with the sound wave of the lock or unlock sound).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method of performing a vehicle function, comprising:
   detecting a vehicle function command, wherein the vehicle function comprises playing a lock or unlock sound in response to receiving a lock or unlock command;
   determining if a current time is within a predetermined time period to determine whether an event mode is active, wherein the event mode includes one or more modifications to the vehicle function compared with a normal mode;
   in response to determining that the event mode is active:
   retrieving an event mode sound, wherein the event mode sound is a first lock or unlock sound; and
   performing the vehicle function based on the retrieved event mode sound by playing the first lock or unlock sound; and
   in response to determining that the event mode is not active:
   retrieving a normal mode sound, wherein the event mode sound and the normal mode sound comprise different sounds, and wherein the normal mode sound is a second lock or unlock sound; and
   performing the vehicle function based on the retrieved normal mode sound by playing the second lock or unlock sound.

2. The method of claim 1, further comprising:
   determining, after activating the event mode, if the current time is still within the predetermined time period; and
   in response to determining that the current time is no longer within the predetermined time period, deactivating the event mode.

3. The method of claim 1, wherein determining if the event mode is active comprises:
   determining if a current time is within a predetermined time period associated with the event mode;
   in response to determining that the current time is within the predetermined time period, displaying a prompt to activate the event mode; and
   in response to receiving instructions responding to the prompt to activate the event mode, activating the event mode.

4. The method of claim 1, wherein:
   the vehicle function further comprises displaying a representation of a pedestrian captured by a vehicle sensor;
   an event mode image file is a representation of a zombie;
   a normal mode image file is a representation of a person; and
   displaying the representation of the pedestrian comprises displaying the retrieved one of the representation of the zombie or the representation of the person.

5. The method of claim 1, wherein:
   the vehicle function further comprises turning on interior lighting of a vehicle;
   an event mode parameter is a first color;
   a normal mode parameter is a second color; and
   turning on the interior lighting of the vehicle comprises turning on the interior lighting in one of the first color or the second color.

6. The method of claim 1, wherein retrieving the event mode sound comprises retrieving the event mode sound from a first memory location, and
   wherein retrieving the normal mode sound comprises retrieving the normal mode sound from a second memory location.

7. The method of claim 6, wherein, prior to retrieving the event mode sound from the first memory location, comprises:
   receiving the event mode sound over a network connection; and
   storing the event mode sound in the first memory location.

8. A vehicle comprising:
   a device configured to perform a vehicle function, wherein the device comprises a speaker; and
   processing circuitry configured to:
   detect a vehicle function command, wherein the vehicle function comprises playing a lock or unlock sound in response to receiving a lock or unlock command;
   determine if a current time is within a predetermined time period to determine whether an event mode is active, wherein the event mode includes one or more modifications to the vehicle function compared with a normal mode;
   in response to determining that the event mode is active:
   retrieve an event mode sound, wherein the event mode sound is a first lock or unlock sound; and
   control the device to perform the vehicle function based on the retrieved event mode sound by playing the first lock or unlock sound via the speaker; and
   in response to determining that the event mode is not active:
   retrieve a normal mode sound, wherein the event mode sound and the normal mode sound comprise different sounds, and wherein the normal mode sound is a second lock or unlock sound; and
   control the device to perform the vehicle function based on the retrieved normal mode sound by playing the second lock or unlock sound via the speaker.

9. The vehicle of claim 8, wherein the processing circuitry is further configured to:
   determine, after activating the event mode, if the current time is still within the predetermined time period; and
   in response to determining that the current time is no longer within the predetermined time period, deactivate the event mode.

10. The vehicle of claim 8, wherein the processing circuitry is configured, when determining if the event mode is active, to:
    determine if a current time is within a predetermined time period associated with the event mode;
    in response to determining that the current time is within the predetermined time period, display a prompt to activate the event mode; and
    in response to receiving instructions responding to the prompt to activate the event mode, activate the event mode.

11. The vehicle of claim 8, wherein:
    the device comprises a display;
    the vehicle function further comprises displaying a representation of a pedestrian captured by a vehicle sensor;
    an event mode image is a representation of a zombie;
    a normal mode image is a representation of a person; and
    the processing circuitry is configured, when controlling the device to perform the vehicle function, to control the display to the retrieved one of the representation of the zombie or the representation of the person.

12. The vehicle of claim 8, wherein:
the device comprises interior lights;
the vehicle function further comprises turning on interior lighting of a vehicle;
an event mode parameter comprises first instructions to display a first color;
a normal mode parameter comprises second instructions to display a second color; and
the processing circuitry is configured, when controlling the device to perform the vehicle function, to control the interior lights to display the first color or the second color based on one of the first instructions or the second instructions.

13. The vehicle of claim 8, wherein retrieving the event mode sound comprises retrieving the event mode sound from a first memory location, and wherein retrieving the normal mode sound comprises retrieving the normal mode sound from a second memory location.

14. The vehicle of claim 13, wherein the control circuitry is further configured, prior to retrieving the event mode sound from the first memory location, to:
receive the event mode sound over a network connection; and
store the event mode sound in the first memory location.

15. A method of performing a vehicle function, comprising:
receiving a command to perform the vehicle function, wherein the vehicle function comprises playing a lock or unlock sound in response to receiving a lock or unlock command;
determining if a current time is within a predetermined time period;
in response to determining that the current time is within the predetermined time period:
retrieving one or more first files, wherein the one or more first files comprise a first lock or unlock sound; and
performing the vehicle function based on the retrieved one or more first files by playing first lock or unlock sound; and
in response to determining that the current time is not within the predetermined time period:
retrieving one or more second files, wherein the one or more second files comprises a second files comprise a second lock or unlock sound; and
performing the vehicle function based on the retrieved one or more second files by playing the second lock or unlock sound, wherein the first sound and the second sound comprise different sounds.

16. The method of claim 15, wherein:
the vehicle function further comprises displaying a representation of a pedestrian captured by a vehicle sensor;
a first image is a representation of a zombie;
a second image is a representation of a person; and
displaying the representation of the pedestrian comprises displaying the retrieved one of the representation of the zombie or the representation of the person.

17. The method of claim 15, wherein:
the vehicle function further comprises turning on interior lighting of a vehicle;
the one or more first files comprises first instructions to display a first color;
the one or more second files comprises second instructions to display a second color; and
turning on the interior lighting of the vehicle comprises turning on the interior lighting in one of the first color or the second color based on the retrieved one of the first instructions or the second instructions.

18. The vehicle of claim 15, wherein the control circuitry is further configured to receive the first lock or unlock sound over a network connection.

* * * * *